United States Patent [19]

Anderson, Jr. et al.

[11] 3,772,016

[45] Nov. 13, 1973

[54] METHOD OF PRODUCING MULTICOLOR PLANOGRAPHIC PRINTING SURFACE

[75] Inventors: Herbert R. Anderson, Jr., San Jose, Calif.; Edward A. Bartkus, Boulder, Colo.

[73] Assignee: International Business Machines Corporation, Armonk, N.Y.

[22] Filed: Jan. 30, 1973

[21] Appl. No.: 327,884

Related U.S. Application Data

[63] Continuation of Ser. No. 103,862, Jan. 4, 1971, abandoned.

[52] U.S. Cl. .......................... 96/31, 96/33, 101/450, 101/456, 101/457, 101/458, 101/459, 204/17

[51] Int. Cl. .......................... G03f 7/02

[58] Field of Search .......................... G03f/1/00; 96/33, 96/31; 101/450, 456, 457, 458, 459; 204/17, 18 PC

[56] References Cited

UNITED STATES PATENTS

| | | | |
|---|---|---|---|
| 2,506,164 | 5/1950 | Morse | 96/36 |
| 2,760,432 | 8/1956 | Wood | 101/457 |
| 3,172,828 | 3/1965 | Shepard et al. | 204/18 PC |
| 3,201,239 | 8/1965 | Neugebauer et al. | 96/33 |
| 3,213,787 | 10/1965 | Miller | 101/211 |
| 3,368,483 | 2/1968 | Storms | 101/450 |
| 3,395,016 | 7/1968 | Loeb | 96/36 |
| 3,402,044 | 9/1968 | Steinhoff et al. | 96/36 |
| 3,474,719 | 10/1969 | Levinos | 96/33 |
| 3,506,442 | 4/1970 | Kerwin | 96/27 R |
| 3,551,150 | 12/1970 | Woodward et al. | 96/33 |

*Primary Examiner*—David Klein
*Attorney*—Donald W. Margolis

[57] ABSTRACT

A planographic printing surface capable of simultaneously printing more than one color is produced from light sensitive plates including at least one conductive metal layer by selectively exposing the light sensitive portion of the plate, developing the light exposed portions, removing either the exposed or nonexposed light sensitive portions, and then, as required, electrolytically coating, etching, or further exposing the portions of the plate thus revealed. Successive applications of this technique may be made. The process results in a planographic printing surface with portions which have differing surface energies and which portions are therefore susceptible to selective wetting by various colored inks having differing surface energies. Inking of the thus produced surface with inks which selectively wet specific portions of the surface, followed by bringing the surface into contact with a to-be-printed article results in a multicolor print in a single pass. In preferred printing processes, the various inks having varying surface energies are mutually nonmiscible with one another.

2 Claims, No Drawings

METHOD OF PRODUCING MULTICOLOR PLANOGRAPHIC PRINTING SURFACE

This is a continuation, of application Ser. No. 103,862 filed Jan. 4, 1971, now abandoned.

BACKGROUND OF THE INVENTION

1. Field of the Invention

This invention relates to processes for producing multicolor planographic printing surfaces by combined photographic, etching, and electrolytic techniques. It also relates to multicolor printing processes.

2. Description of the Prior Art

In the most common practice, multicolored prints are obtained from a plurality of printing surfaces, each surface representing a separate color portion of the final print, the printing surfaces being precisely registered one color with the other in a printing system. In operation, the to-be-printed article is run through the press for each color separately, or it is run successively through a series of appropriately spaced printing plates, whereby each printing surface prints a single color, presumably in registry with the other colors. The process thus requires the preparation of a number of separate printing surfaces, and the exact registry of the several plates with each other and with the article on which the final multicolor reproduction is to be printed.

Attempts to produce a multiple color print in a single operation have been made utilizing specially prepared inking rolls and inking apparatus geometry, or by utilizing special plate geometry. Also, electrostatic techniques have been utilized to selectively ink printing surfaces with multiple colors.

As is detailed hereinbelow, the present invention utilizes none of these techniques, but relies upon the preparation of a printing surface primarily by photographic, and electrolytic techniques, with the result that the surface produced is subject to selective wetting by different inks having different surface energies, so that more than one color of ink can be applied to a to-be-printed article in a single printing operation from a single planographic plate.

The concept of utilizing selectively wetted surfaces is taught to a limited extent in the prior art. Indeed, the entire concept of lithographic printing is based upon the fact that surfaces exhibiting different surface energizes will attract or reject certain liquids selectively. In classical lithography, portions of a printing surface are rendered greasy or oleophilic, while the remaining portions of the surface are rendered hydrophilic or oleophobic. The hydrophilic or oleophobic portion of the surface has the greatest surface energy and is wetted with water so that it repels oil-based inks. When oil-based ink is brought into contact with the surface, the only portions of the surface which are wetted by the lower surface energy oil are the oleophiic portions. The water wetted portions of the surface repel the ink. The ink which is attracted is then transferred from the surface to produce a printed image.

There are other compatible and noncompatible printing surfaces and inks besides the classical oil and water relationship. With the development of modern polymer chemistry, systems based upon silicones and fluorocarbons have been discovered having differing surface energies, one from the other, and also different from either oil or water systems. The combination of these characteristics to produce an intaglio printing surface has been contemplated in the prior art. However, the method of producing a printing surface by the known prior art requires both complex photographic processing and tedious mechanical steps to produce the selectively wetted surface portions. In operation, the known prior art requires the preparation of multiple photographic masks and color masks, and it also requires the application of these masks to a surface in the proper sequence and in the exactly proper registration to produce a printing surface which must then be tediously rendered selectively wettable by either slow manual means or by techniques which once more require a high degree of registration of multiple masks. Even when properly registered, these latter masks tend to leak when liquids are applied to them, thus resulting in smeared colors

SUMMARY OF THE INVENTION

In its simplest form, the present invention contemplates the use of a simple photographic plate consisting of a photosensitive layer coated on a metallic substrate. A portion of the photosensitive layer is exposed to light in a pattern corresponding with a single color. The exposed plate is then processed and either the exposed portion or nonexposed portion of the photosensitive layer removed, depending upon whether the original photosensitive layer is a negative-acting or positive-acting material. Subsequently, the revealed metal substrate is electrolytically coated. The electrolytically coated material may be a metal, in which case, depending upon whether the substrate metal is hydrophilic or oleophilic, a metal having opposite characteristics may be chosen. Alternatively, utilizing electrophoretic techniques, polymeric materials having surface characteristics other than hydrophilicity or oleophilicity will be chosen. Typical materials include polymeric silicone or polymeric fluorocarbon compounds deposited from suitable emulsion baths. Thus, by utilizing the technique of the present invention, a planographic surface can be easily produced which surface is selectively wetted at different portions by inks which are selectively attracted to the electrolytically deposited material and the remaining photosensitive material.

From this basic concept, it is relatively easy to develop techniques for producing three, four, or more surface portions having distinct and different surface energies. For example, portions of the remaining photosensitive layer in the above discussed plate can be removed to expose the underlying metal substrate which has its own unique surface energy characteristics. Alternatively, once additional areas of metal substrate are revealed, they may be electrolytically coated with a second material having yet a different surface energy characteristic, and so on.

The practice of the present invention also contemplates the utilization of more complex original plates. For example, a plate including two or more separate and distinct layers of photosensitive material may be utilized to advantage. In this type of arrangement, different portions of the metal substrate may be revealed sequentially by a controlled light exposure routine of the photosensitive layers. This latter arrangement, would, of course, facilitate the process of revealing different portions of the metal substrate at different times, and selectively coating them with specific materials utilizing electrolytic techniques. In another alternative system, two or more layers of metal may be utilized beneath the photosensitive material, each layer of metal preferably having different surface energy characteristics, that is, one being oleophilic, for example, and the other being hydrophilic. In this latter arrangement, after light exposure and processing to reveal the uppermost metal layer through the photosensitive material, the next lower metal layer may be revealed by ordinary etching techniques. Of course, any revealed metal layer in a multi-metal system may be utilized as a substrate for electrolytic deposition of additional materials.

In yet another embodiment of the present invention, the surface of the metal layer opposite the surface which is coated with photosensitive material can be attached to a polymeric substrate. In this latter case, etching through revealed metal will reveal the polymeric substrate. Proper selection of surface energy characteristics in the polymeric substrate, and metals, coupled with additional electrolytic deposition of material, will result in a printing surface capable of being selectively inked to print multiple colors in a single pass.

The objects, features and advantages of the present invention will be apparent from the following description of the preferred embodiments of the invention.

DESCRIPTION OF THE PREFERRED EMBODIMENTS

In the following embodiments, standard commercially available photoresists, of both the positive and negative working type, photoresist developers and removers, classical silver halide gelatin emulsions and their well known developers are utilized extensively without detailed description of their preparation or characteristics. In view of the development of the state of the art of both photoresist techniques and silver halide gelatin emulsions, it is believed that persons having skill in these arts can implement them with little difficulty. Certain oleophilic and hydrophilic metals are referred to specifically throughout the descriptions of the preferred embodiments. One skilled in the art will understand that other metals having similar surface energy characteristics are well known in the art, and that other metals can be rendered either hydrophilic or oleophilic by suitable well known treatment. Rather than dwell on these details, the processing techniques which are utilized in preparing planographic printing surfaces capable of printing more than one color with a single pass are emphasized. For additional details, any currently published text can be referred to.

As detailed hereinafter, this invention teaches techniques for the fabrication of planographic printing plates carrying multiple image portions which are selectively wetted by different color and preferably mutually non-miscible inks. The image areas are formed utilizing combinations of photochemical and electrolytic techniques which selectively add and subtract specific materials to an initial photosensitive plate. As is also detailed hereinafter, the inks are formulated to be mutually immiscible and to have surface energies which cause them to wet specific plate surfaces selectively. As is also detailed hereinafter, the sequence of ink application as a function of these surface energies is critical and requires that the highest surface energy ink be applied to the plate surface first, followed by the ink having the next highest surface energy, and so forth.

In a first procedure, a multicolor printing surface is prepared utilizing as a substrate a normally hydrophilic metal material, such as aluminum or chromium, for example, on which hydrophilic metal substrate is coated a silver halide gelatin photographic emulsion. Using color filters or a specially prepared color separation negative, a latent image is formed in the photographic emulsion, the image portions corresponding to a specific desired color in the final print. The image is then developed under light conditions which do not affect the remaining photographic emulsion, using a developer based upon, for example, paraphenylenediamine, glycine, and sodium sulfite. While maintaining the developed plate under controlled light conditions to avoid further exposure, the plate is treated with an image softening solution based, for example, on hydrogen peroxide. See Photographic Chemistry by Pierre Glafkides, Volume 2, at pages 668 and 669, published by the Fountain Press of London in 1960. Such solutions soften and solubilize the developed silver and gelatin image area allowing them to be removed with gentle washing to reveal the underlying hydrophilic metal. While still avoiding further light exposure, this plate is placed in an emulsion solution of fluorocarbon polymer, such as polytetrafluoroethylene, the metal rendered cathodic, and the emulsion caused to deposit fluorocarbon polymer onto the revealed metal surface. The plate is then water-rinsed and gently air dried. At this point, the still photosensitive silver halide gelatin emulsion portion can be exposed to a second series of images, such images corresponding to a second desired color, the latent image developed and the image areas once more solubilized and removed to reveal the hydrophilic metal surface. At this point, the entire plate can be given an overall exposure to light and subjected to tanning development, dried and baked at a relatively high temperature to fuse the deposited polymeric emulsion and harden the remaining developed gelatin and silver portion. The resulting plate thus would have surface portions having three distinct surface energy characteristics, which different portions are capable of being selectively wetted by specific inks of different colors. The portion of the plate surface consisting of fluorocarbon polymers would be selectively fluorophilic. The exposed and developed silver gelatin portion would be selectively oleophilic. The exposed metal, such as chromium, would be selectively hydrophilic. As is discussed hereinbelow, based upon the surface energy relationships among the different surface portions, as well as the surface energy characteristics of the different inks, selected are utilized to coat selected portions of this plate and reproduce multiple colors in a single step printing operation.

It will be apparent to one skilled in the art, that the practice of the present invention encompasses carrying the foregoing procedure through several additional steps. For example, additional material, such as a silicone based polymer which would be siliconephilic, or an oleophilic metal, such as copper, could have been electrolytically deposited at the exposed metal surface. Furthermore, other areas of the plate could have been exposed, removed, and also electrolytically coated with materials having selected surface energies to thereby produce four or more types of uniquely wettable surfaces. Finally, for example, if the background silver halide gelatin emulsion were not generally exposed, developed and hardened, all of the silver halide gelatin material remaining on the surface could be removed to reveal the underlying hydrophilic metal. In this latter situation no oleophilic material would be present unless portions of the emulsion were exposed and developed, but not removed, or unless an oleophilic metal or polymer had been deposited on the revealed hydrophilic metal surface at selected portions.

In a second procedure for the fabrication of a multicolor planographic printing plate, a multi-metal substrate is utilized and coated with a positive-acting photosensitive material. For example, a base layer of oleophilic metal, such as copper, is coated with a hydrophilic metal, such as chromium, and the hydrophilic metal coated with a photosolubilizable material in the form of a positive-acting photresist, such as is a vailable from the Shipley Company as AZ-1350. The photoresist is exposed at portions corresponding to a given color and developed using the manufacturer's recommended developer so that the exposed portions are solubilized and removed to reveal the hydrophilic metal surface beneath the resist. It is seen that this procedure is quite similar to that followed in the previous example in which the silver halide gelatin emulsion was exposed and developed, with removal of the developed image portion. The revealed portion of the metal plate surface is coated electrophoretically with a thin film of fluorocarbon polymer, such as polytetrafluoroethylene from a latex emulsion, and the resulting plate rinsed and dried, all without exposing the remaining photosensitive material to additional actinic light. In a similar manner, a second image exposure is carried out, the exposed portions again corresponding to a specific color, and this portion developed and removed as previously described, to once more reveal a portion of the metal surface. The thus-revealed metal surface portions are again electrophoretically coated, but this time with a silicone polymer, such as from an emulsion of high molecular weight polydimethylsiloxane, and the plate rinsed and dried. The remaining photo-resist is then exposed at selected portions for a third time, developed, and the exposed resist removed to once more reveal the metal base. However, at this time, rather than depositing additional material, the revealed hydrophilic metal is etched away using any suitable etching system to reveal the oleophilic metal layer therein below. Subsequently, the entire remaining layer of photoresist is exposed, developed and removed to reveal the uppermost hydrophilic layer of metal. The resulting planographic plate thus provides four selectively wettable surfaces, each having a distinct surface energy, and consisting of hydrophilic metal, such as chromium, oleophilic metal, such as copper, siliconephilic silicone polymer and fluorophilic fluoro-carbon polymer. In preferred embodiments, the plate is heated at a temperature of about 450°F. to fuse and more firmly adhere the polymer films. The technique of inking and utilizing the resulting plate to produce a multicolor print with one pass is described hereinbelow.

As a third example of the present invention, a photosensitive article is utilized consisting of a polymeric substrate on which a layer of oleophilic metal is coated, and with a layer of hydrophilic metal coated on the first metal layer. The uppermost metal layer is in turn overcoated with a positive-working photoresist. Utilizing this article, the photosensitive layer is exposed imagewise, developed and the unexposed portions removed to reveal portions of the underlying substrate metal. The unprotected metal portions may now be removed by sequential etching to reveal the polymer substrate. A second exposure of the remaining photosensitive layer followed by development reveals the uppermost metal layer once more. Further etching of the metal may be desired at this time. Finally, the remaining photosensitive material is stripped away to reveal a planographic printing surface having selectively wettable metal surfaces. In preferred embodiments, during the processing of this type of plate, exposed metal portions may be selectively electrolytically coated with other metals or polymers to produce selectively wettable areas or selectively etched to reveal the underlying oleophilic metal.

In the practice of the present invention the silver halide gelatin photographic emulsion may be exposed by projection techniques from a full color photographic transparency or from an original image using suitable color separation filters. Alternatively, the silver halide gelatin emulsion may be formulated to include dye sensitization materials to render the film panchromatic. Thus, in the practice of the present invention, color separation negatives, which are almost always required in the prior art techniques of contact printing exposure, are unnecessary and not required. This advantage, by itself, renders the present invention highly attractive over the prior art techniques.

As has already been noted, the inks utilized in producing multicolor prints in a single pass from the plates produced in accordance with the present invention must have distinctive surface energy levels which selectively wet the portions of the planographic printing surface. For example, in the practice of the present invention, commerically available oil-based inks, such as Miller-Cooper yellow ink No. L3000 may be utilized to ink the oleophilic portions of the plate surface. In a similar manner, an aqueous based ink containing water soluble and oil insoluble dyes such as methylene blue and sodium eosin may be utilized to wet the hydrophilic portions of the surface. In order to ink the fluorophilic portions of the printing surface, an ink based upon a liquid aliphatic fluorocarbon vehicle, such as perfluorocyclohexane, may be utilized either uncolored, to provide a background, or with compatible colorants such as perfluoroheptylated phthalocyanines, introduced into the vehicle to yield colored images from the fluoro-carbon portions of the printing surface. In order to wet and ink the silicone surface portions of the plate, a polydimethylsiloxane fluid with or without a pigment can be utilized. Other types of ink may also be used, with appropriate coloring agents.

Care must be exercised in inking the planographic printing surface with the several inks hereinabove described or with other inks of varying surface energy. Unlike the suggestions of the prior art, the inks cannot be introduced into a common receptacle and allowed to separate in accordance with their density and mutual immiscibility. Rather, in order to successfully ink a complex surface, the various inks must be applied in the order of decreasing surface energy values, with the highest surface energy fluid being applied first so as to selectively coat its preferred material and thereby exclude the later applied lower surface energy materials from coating that area. With regard to the inking fluids discussed herein, water has the highest surface energy, with oil being less than water, silicone fluid being less than oil, and fluorinated fluids being less than silicone. Therefore, in order to properly and successfully coat a plate containing hydrophilic, oleophilic, siliconephilic and fluorophilic portions, the water based inks would have to be applied first, followed by the oil-based ink, then the silicon-based ink, and, finally, by the fluorocarbon fluid based ink. Separate fountains for each ink may be used or the inks may be applied by brush, roll, squeegee, or in various other known ways. Preferably, and in fact, the various ink materials are mutually immiscible.

While the invention has been particularly described with reference to preferred embodiments thereof, it will be understood by those skilled in the art that various changes in form and details may be made therein without departing from the spirit and scope of the invention.

What is claimed is:

1. A method of producing a planographic printing surface having portions which have differing surface energies for at least three color single contact printing when used with at least three differently colored fluids having differing surface energies, which fluids are each selectively attracted to one type of surface portion exhibiting a specific surface energy and repelled by the other surface portions, said planographic printing surface being produced from an original plate including a conductive hydrophilic metal layer and a light sensitive layer of silver halide gelatin emulsion coated on said metal, said light sensitive layer being substantially parallel to and coextensive with said metal layer, said light sensitive layer being selectively removable when subjected to development treatment, the method including the steps of:

exposing selected portions of the light sensitive layer to light while maintaining the non-exposed portions to retain their light sensitivity;

developing and removing the exposed portions of the light sensitive layer from the original article to bare areas of hydrophilic metal through the removed portions, while maintaining the non-exposed portions to retain their light sensitivity;

electrolytically depositing a first material on the bared areas of hydrophilic conductive metal, said deposited material having a surface energy different from the surface energy of the hydrophilic conductive metal layer, said deposited material being selected from the group consisting of fluorocarbon polymers, silicone polymers and oleophilic metals, while maintaining the non-exposed portions to retain their light sensitivity;

exposing additional selected portions of the area of the remaining light sensitive layer to light while maintaining the remaining non-exposed parts to retain their light sensitivity;

developing and removing the exposed portions of the light sensitive layer from the original article to bare areas of hydrophilic metal through the removed portions, while maintaining the non-exposed parts to retain their light sensitivity;

electrolytically depositing a second material on the bared areas of hydrophilic conductive metals, said deposited material having a surface energy different from the surface energy of the hydrophilic conductive metal layer and the previously electrolytically deposited material, said deposited material being different from said first material and being selected from the group consisting of fluorocarbon polymers, silicone polymers and oleophilic metals, while maintaining the non-exposed parts to retain their light sensitivity; and then fully exposing the remaining light sensitive materials and subjecting them to hardening development.

2. The method of claim 1 wherein after the second exposure and electrolytic deposition, and prior to full exposure and development, additional selected portions of the light sensitive layer are exposed to light and processed to remove portions of said layer to bare areas of hydrophilic conductive metal, while handling the remaining light sensitive portions in a manner to retain their light sensitivity.

* * * * *